United States Patent
De Vries (10) Patent No.: US 10,743,481 B2
(45) Date of Patent: Aug. 18, 2020

(54) TURF BASED SPORTS GROUNDS

(71) Applicant: Rockwool International A/S, Hedehudene (DK)

(72) Inventor: Linda De Vries, Heerlen (NL)

(73) Assignee: ROCKWOOL INTERNATIONAL A/S, Hedehusense (DK)

( * ) Notice: Subject to any disclaimer, the term of this patent is extended or adjusted under 35 U.S.C. 154(b) by 478 days.

(21) Appl. No.: 15/533,977

(22) PCT Filed: Dec. 18, 2015

(86) PCT No.: PCT/EP2015/080657
§ 371 (c)(1),
(2) Date: Jun. 7, 2017

(87) PCT Pub. No.: WO2016/102403
PCT Pub. Date: Jun. 30, 2016

(65) Prior Publication Data
US 2018/0332783 A1    Nov. 22, 2018

(30) Foreign Application Priority Data
Dec. 22, 2014   (EP) .................................... 14199903

(51) Int. Cl.
*A01G 24/00* (2018.01)
*A01G 24/18* (2018.01)
(Continued)

(52) U.S. Cl.
CPC ............. *A01G 24/18* (2018.02); *A01G 20/00* (2018.02); *A01G 24/00* (2018.02); *C09K 17/08* (2013.01);
(Continued)

(58) Field of Classification Search
CPC ...... A01G 1/005; A01G 9/1086; A01G 20/00; A01G 20/20; A01G 24/18; A01G 24/00; A01G 31/001
(Continued)

(56) References Cited

U.S. PATENT DOCUMENTS 4,790,691 A * 12/1988 Freed ..................... C09K 17/16
106/900
4,867,614 A * 9/1989 Freed ..................... C09K 17/16
405/263
(Continued)

FOREIGN PATENT DOCUMENTS

EP    1 059 396 A1    12/2000
FR    2 877 956 A1     5/2006
(Continued)

OTHER PUBLICATIONS

International Search Report and Written Opinion for corresponding PCT Application No. PCT/EP2015/080657.
(Continued)

*Primary Examiner* — Ebony E Evans
(74) *Attorney, Agent, or Firm* — Tarolli, Sundheim, Covell & Tummino LLP (57) ABSTRACT

A grass sports ground is produced by mixing man-made vitreous fibres into soil having relatively high loam levels at a rate in the range 0.5 to 50 parts by weight per 100 parts soil (dry weight), preferably in the presence of moisture to separate the fibres and distribute them among soil particles, and then growing grass. The soil/fibre mixture has desirable moisture management properties as well as good mechanical characteristics providing extended use characteristics even in cold, wet or hot and dry conditions.

38 Claims, 2 Drawing Sheets

(51) Int. Cl.
*E01C 13/08* (2006.01)
*E01C 13/02* (2006.01)
*A01G 20/00* (2018.01)
*C09K 17/08* (2006.01)
*E01C 21/00* (2006.01)
*E02D 3/00* (2006.01)
*E02D 3/02* (2006.01)
*A01G 20/20* (2018.01)

(52) U.S. Cl.
CPC .............. *E01C 13/02* (2013.01); *E01C 13/08* (2013.01); *E01C 21/00* (2013.01); *E02D 3/005* (2013.01); *E02D 3/02* (2013.01); *A01G 20/20* (2018.02)

(58) Field of Classification Search
USPC ....................................................... 47/1.01 F
See application file for complete search history.

(56) References Cited

U.S. PATENT DOCUMENTS

| | | | | |
|---|---|---|---|---|
| 4,916,855 A * | 4/1990 | Halliday | ............... | E01C 13/083 404/31 |
| 5,020,936 A * | 6/1991 | Malmgren | ............ | E01C 13/065 404/31 |
| 5,326,192 A * | 7/1994 | Freed | ................... | E01C 13/083 47/9 |
| 5,368,626 A | 11/1994 | Schnuda | | |
| 6,032,410 A * | 3/2000 | Kumar | ................... | A01G 20/20 47/56 |
| 6,042,305 A * | 3/2000 | Novich | ................... | C09K 17/40 106/900 |
| 6,551,689 B1 * | 4/2003 | Prevost | ................... | B32B 3/085 428/143 |
| 7,059,083 B2 * | 6/2006 | Abitz | ..................... | A01G 20/20 47/56 |
| 7,484,330 B2 * | 2/2009 | Lougheed | .......... | A01G 13/0262 47/9 |
| 10,066,344 B2 * | 9/2018 | de Vries | .................... | E01C 7/04 |

FOREIGN PATENT DOCUMENTS

| | | |
|---|---|---|
| NI | 1013987 C2 | 7/2001 |
| WO | 2012/123507 A1 | 9/2012 |
| WO | 2014/029873 A1 | 2/2014 |
| WO | 2014/135681 A1 | 9/2014 |

OTHER PUBLICATIONS

International Preliminary Report on Patentability for corresponding PCT Application No. PCT/EP2015/080657.
Extended European Search Report for corresponding European Application No. 14199903.7.
Definition of "loam" by Merriam-Webster; http://www.merriam-webster.com/dictionary/loam.
Definition of "loam" by Wikipedia, the free encyclopedia; https://www.en.wikipedia.org/wiki/Loam.
Definition of "silt" by Wikipedia, the free encyclopedia; https://www.en.wikipedia.org/wiki/Silt.

* cited by examiner

TURF BASED SPORTS GROUNDS

RELATED APPLICATIONS

The present application is a U.S. National Stage Application under 35 USC 371, claiming priority to PCT Serial No. PCT/EP2015/080657, filed on Dec. 18, 2015; which claims priority to European Patent Application Serial No. 14199903.7, filed on Dec. 22, 2014, the entirety of all of which are incorporated herein by reference.

FIELD OF THE INVENTION

The present invention relates to sports grounds for supporting growth of grass for playing various sports including team based sports played out of doors, especially in cold or in dry climates.

BACKGROUND OF THE INVENTION

WO2014/029873 describes structure for draining surface water from sports grounds comprising a coherent force distribution layer and a drain layer. The drain layer is formed of an array of coherent man-made vitreous fibre (MMVF) drain elements, each of the drain elements comprising fibres bonded with a cured binder composition. The force distribution layer is present to ensure that drain elements positioned below it are not destroyed or do not move out of position when pressure is applied to the surface of the sports ground. The force distribution layer is preferably 1 to 5 cm thick. The force distribution layer may be a coherent MMVF layer, and examples given have a high compressive strength preferably in the range 30 to 60 kPa. Suitable coherent MMVF layers have preferred density in the range 150 to 200 kg/m$^3$, and are preferably rendered coherent using a hydrophilic binder, optionally additionally including a wetting agent. Over the force distribution layer is an upper layer of grass.

In view of the functions of the drain element and force distribution layer, both must be coherent, that is the fibres must be bound together into a coherent mass. The MMVF layers provide moisture management, to avoid sports grounds becoming water-logged, by providing controlled drainage.

NL1013987 discloses the use of stone wool granulate in layers beneath natural grass for improving stabilisation of the soil of the ground thereby improving the flatness of the playing field, even where the grass is played on excessively. The layer into which the stone wool is introduced additionally comprises sand or top-soil in addition to the stone wool granulates. A granulate is a jagged and angular agglomeration of fibres, and this shape avoids displacement of the granulates relative to one another thereby providing the stabilisation. The granulates have sizes up to around 3 mm. These granulates are applied onto a layer of top-soil around 0.08 m thick applied over a layer of sand also present in a thickness of around 0.08 m. After levelling of the stone wool granulate and optional application of fertiliser, a tilling device is used to mix the top layers, ensuring some but not all of the sand layer is mixed. On top of this is applied organic material which is mixed into the underlying layer. Finally the top layers including all of the sand layer are mixed using a harrow. The mixing sequence is intended to move the various materials in a vertical direction only, but also to leave a high content of stone wool granulate and organic material near the surface, and thereby allow the stabilising effect of the stone wool granulates to be achieved.

The nature of the starting wool material is not described in detail, for instance regarding the presence of any binder or wetting agent. The present inventors have established that, when granulates of wool remain in grass-growing layers the extent of availability of moisture to the roots of growing plants appears to be limited.

Other descriptions of incorporating stone wool and glass wool into soil based surfaces have been described. For instance in U.S. Pat. No. 5,683,208 bundles of glass filaments are mixed with sand or pulverulent materials to provide sub layers for tracks or roads or sports terrains having improved stability. The bundles of fibres may be produced in situ at the site of the roadway construction, using an apparatus which chops preformed yarns of the glass fibre and distributes this in sand. The process involves distribution of the cut bundles onto a layer of sand on a conveyor, followed by application of another layer of sand, and appears to minimise working of the bundles with sand, while optimising distribution.

A development of the process described in U.S. Pat. No. 5,683,208 is described in WO9721876, where a premix of fibre bundles and sand is produced having the relatively high concentration of fibre, in the range 6-60% by weight. This premix is then mixed as a master-batch into soils or other base material, thereby diluting the fibres in the final product. The master-batch is produced by mixing sand with water and then introducing and mixing the cut bundles of fibres, in a device of the type used to knead doughs. Alternatively, a plough share mixer is used. The process is said to form a master-batch in which the fibres are distributed in a uniform manner in the sand. Even distribution into soil of the fibres is achieved when the master-batch is diluted by mixing into soil.

WO2012123507 provides a method of modifying a riding surface formed of sand, that is used as a non-grassed surface for training and competition, for indoor and outdoor use. The surface is formed of a mixture of sand with stone wool fibres, for instance fibres having good biosolubility at pH 4.5, generally having a length of at least 2000 microns, at least 3000 microns, and having diameters in the range 3-15 μm, preferably in the range 6-12 μm. The fibres are supplied in the form of a granulate which comprises flocks of entangled fibres. Generally the flocks are substantially free of binder and of wetting agent. Preferably the flocks have a low content of shot (particles of size more than 63 μm which are non-fiberised). The stone fibres are preferably blended in an amount in the range 1-30% by weight, preferably in amounts in the range 3-10% by weight. The surface is usually formed by providing a layer of sand onto the surface, distributing the flocks of MMVF wool, followed by compacting the surface using a roller, then wetting the fibres down, followed by mixing using a power harrow, until a homogeneous mixture of sand and fibres covers the surface.

Slabs of mineral fibre wool bound with hydrophilic binder and further impregnated with wetting agent are used extensively as growth media for food crops, especially salad crops in greenhouses or otherwise under plastic. Such slabs are optimised for management of irrigation and nutrition for the plants, and properties which affect root growth have been studied extensively.

Although synthetic soccer pitches are in use in some parts of the world, it is generally far preferred for soccer pitches to be formed of growing grass. Since the pitches must be used over long seasons, and have heavy use, it is important than grass growing conditions are optimised. For this water management of the soil medium in which the grass grows is critical. It is important that the ground does not become water-logged, since growth of the grass suffers and the mechanical characteristics of the surface also deteriorate. It is also important that moisture be available to roots, to allow grass growth, rather than draining to lower layers of ground before the plant roots. Soccer pitches also should provide a range of desired mechanical characteristics in terms of resisting deformation, resisting penetration, whilst having some elasticity so that the surface springs back after being subjected to disrupting forces. There is also a requirement that the grass resist torsion, in order to avoid joint and soft tissue damage to players on the pitch, and to minimise grass roots or soil being torn out in divots, which may require expensive maintenance and repair.

Soccer pitches for use in cold climates may be restricted in terms of the time available for use where, upon reducing temperatures the soil freezes quickly. It would be desirable that frost damage at atmospheric conditions of lowering temperatures be minimised, by providing soil surfaces with reduced rate of cooling.

SUMMARY OF THE INVENTION

According to the present invention there is provided a plant growth medium comprising soil that comprises 1 to 10% loam, at least 0.5% by weight organic matter and has particulate size distribution having a M50 value in the range 100-500 μm and having at least 95% by weight particle size less than 4 mm, further comprising man-made vitreous fibres (MMVF), wherein the man-made vitreous fibres are present in an amount of from 0.5 to 50 parts by weight per 100 parts by weight soil, on a dry matter basis, and wherein the fibres are present in loose form distributed in the soil particulate matter.

DETAILED DESCRIPTION OF THE INVENTION

The soil used in the present invention should preferably be top-soil quality soil, for instance of the type conventionally used for creating the growing surface of sports grounds. Such soil should have a significant level of loam, that is of size fraction, that is the fraction that passed through a sieve with 0.063 mm openings. In the present invention, the term "loam" is used to define the particle size fraction of soil and not the chemical nature of the soil, nor the source of the particles. In the area of soil analysis, it is standard to determine the particle size of soil by sieve analysis. Preferably the amount of loam is less than 7.5%. The invention is of particular value where there is a significant proportion of such small particle size material, since it helps moisture management in the soil by preventing such small particles leading to retention of moisture as ground water by maintaining an open structure. The amount of loam in the soil is therefore at least 1% by weight, for instance more than 2% by weight, and even as much as 5% by weight or more.

The soil that is used should preferably have a low or negligible amount of fine or coarser gravel. Thus preferably at least 95% by weight, more preferably at least 99% by weight, for instance 99.9% by weight should pass through a standard sieve having aperture of 4 mm. It is found that good characteristics are achieved where the amount of material in the soil that is classed as coarse sand, that is passing sieves having openings of 1.0 mm, should be at least 90% by weight, preferably at least 95% by weight. The proportion of material which is classified as medium sand, that is which passes through a sieve having an opening of 1 mm, but does not pass through a sieve having an aperture of 0.25 mm, is in the range 10-50% by weight, for instance 20-40% by weight. Preferably the bulk of the particulate has particle size such that it passes through a sieve having an opening of 0.25 mm, and does not pass through a sieve having an opening of 0.063 mm. For instance the fraction having this granulometry is preferably at least 40% by weight, more preferably at least 50% by weight, although it is unnecessary for the amount to be more than 80% by weight. The granulometry of the soil may have a narrow size distribution or a broad size distribution. Preferably the M50 (that is the median particle size), by weight, calculated from the sieve granulometry, is in the range 100-500 μm, for instance in the range 150-300 μm, preferably in the range 200-250 μm.

We have found that the proportion of MMVF in soil may vary over a wide range, depending on the mechanical characteristics and drainage characteristics required of the plant growth medium product. For instance proportions within the range specified in the claim at the higher end of the range, for instance above 20 parts by weight per 100 parts soil, are useful where the plant growth medium is to be used to provide growth media for deep rooting, perennial plants such as shrubs, bushes and trees. The proportion of fibres is also preferably higher where the level of organic matter and/or loam is relatively high.

Where the plant growth medium is to be used for an engineered surface such as a sports ground, in which grass is the plant to be grown, the proportion of MMVF is preferably in the range 1-30 parts per 100 parts by weight soil, more preferably in the range 2-20, for instance 4-10, parts per 100 parts soil. We have found that lower levels of fibre generally provide inadequate moisture management and improvement in mechanical characteristics. Amounts above the preferred range are unnecessary to achieve the desirable characteristics and may require excessive work to blend with the soil during production of the plant growth medium.

It has been found that the generation and use of the plant growth medium is optimised where the moisture content of the mixture is in the range 1-50% parts by weight moisture to 100 parts soil, more preferably in the range 5-20% by weight. The presence of moisture during generation of the plant growth medium assists in distribution of MMVF in the soil particulates. The plant growth medium is capable of retaining relatively high levels of moisture without the top surface of a layer in which plant material is growing becoming water-logged. Furthermore the presence of MMVF retains moisture to a greater extent than the soil from which fibre is absent, and allows the moisture to be accessible by the rates of plants growing in the medium, thereby achieving improved growth.

In the invention it is preferred to use MMVF wool that is substantially free of binder and of wetting agent. However, in some embodiments the starting wool may comprise wetting agent, and in some embodiments, binder. Where binder is included it is preferably hydrophilic binder.

The fibres used in the invention are stone wool fibres. Thus, generally the fibres are man-made vitreous fibres which have content of alkaline earth metals (calcium oxide and magnesium oxide) from 10 to 40 wt %. They also contain the other usual oxide constituents of mineral wool. These are silica; alumina; alkali metal oxides (sodium oxide and potassium oxide) which are usually present in lower amounts; and can also include iron oxide, titania and other minor oxides. In some cases the stone wool fibres can have a content of iron oxide at least 3 wt % (calculated as $Fe_2O_3$).

In general, the stone wool fibres preferably have content of oxides as follows:

| | |
|---|---|
| $SiO_2$ | 35 to 50, preferably 38 to 48 |
| $Al_2O_3$ | 12 to 30, preferably 15 to 28 |
| $TiO_2$ | up to 2 |
| $Fe_2O_3$ | 2 to 12 |
| CaO | 5 to 30, preferably 5 to 18 |
| MgO | up to 15, preferably 1 to 8 |
| $Na_2O$ | 0 to 15 |
| $K_2O$ | 0 to 15 |
| $P_2O_5$ | up to 3 |
| MnO | up to 3 |
| $B_2O_3$ | up to 3 |

These values are all quoted as wt % oxides, as is conventional. The fibres can preferably have good bio-solubility at pH 4.5. This bio-solubility can be determined by known means, for instance in vitro in terms of a dissolution rate at acid pH (about pH 4.5) of at least 25 nm/day. Alternatively the bio-solubility may be determined in vivo in known manner.

The fibres preferably have length at least 2000 microns, preferably at least 2500 microns, more preferably at least 3000 microns. The length can be determined by any method known in the art of man-made vitreous fibres, using standards to normalise the results. One example is a method in which the length of the fibres is measured automatically using a microscope, with a camera and image analysing software. First, a well dispersed sample is prepared on a Petri dish. The sample is heat cleaned at 590° C. for 10 minutes. 0.4 g of the heat cleaned fibres are dispersed, by the use of ultrasound, in 36 ml of dispersing solution (ethylene glycol 49.5% vol, water 49.5% vol and 1% non-foaming dispersing aid). 0.7 ml of this dispersion is again diluted in 36 ml dispersing solution. 0.7 ml of this dispersion is applied on a Petri dish and divided thoroughly on the surface. A microscope with a magnification of 1.25×1 is used to view the fibres and their length is measured. From these measurements, the numeric average length can be calculated. For the reproducibility of results, the number of measurements should be higher than 500.

We find that fibres having lengths above these minima also tend to give best results in terms of cohesivity in a sports ground surface. Length at least 3500 microns can be particularly effective.

Useful fibres have length not more than 5000 microns, oftennot more than 4500 microns, although longer fibres would also be usable in the invention, provided they are not so long that mixing becomes difficult.

The diameter of the fibres is generally in the range 3 to 15 microns, preferably in the range 6 to 12 microns. Fibre diameter can be determined by any method known in the art of mineral fibres, using standards to normalise the results. One example is a method in which the diameter of the fibres is measured automatically using a microscope, with a camera and image analysing software. A sample is heat cleaned at 590° C. for 10 minutes. Then the sample is pressed to obtain a length of approximately 30 microns. 0.05 g of the pressed fibres is dispersed, by the use of ultrasound, in 36 ml dispersing solution (ethylene glycol 49.5% vol, water 49.5% vol and 1% non-foaming dispersing aid). 0.05 ml of this dispersion is applied on a Petri dish and thoroughly divided on the surface. A microscope with a magnification of 1.25× 10 is used to view the fibres and measure their diameters. From these measurements, the numeric average diameter and mass weighted average diameter can be calculated. For the reproducibility of results, the number of measurements should be between 1000 and 1200.

Values for fibre dimensions in this description are expressed as numeric averages.

The fibres preferably have hardness of around 6 Moh.

The melting point of the fibres is preferably more than 1000° C.

The specific density of the fibres is generally in the range 2 to 3.5 $g/cm^3$, preferably 2.5 to 3.0 $g/cm^3$.

Preferably the starting material for adding to soil provides the fibres in the form of flocks of wool of entangled fibres. The wool can be produced by pouring mineral melt onto spinning wheels, the melt being thrown off the wheels in the form of fibres and non-fiberised shot. The fibres are of sufficient length to become entangled with one another to form flocks. They are carried from the spinning wheels in an airflow and collected as bales.

The fibres can be coated with various additional components such as binder or wetting agent, for example, but preferably the stone fibres that are mixed with the soil to form the plant growth medium are free of binder and wetting agent and consist essentially of vitreous material.

The fibre product used preferably has a relatively low level of non-fiberised materials (commonly known as shot). Accordingly, the amount of shot (particles of size more than 63 microns which are non-fiberised) in the bulk fibres mixed with the sand is preferably not more than 40 wt %, preferably not more than 35 wt %. Preferably the amount of non-fiberised material having size above 250 microns is not more than 15 wt %, preferably not more than 10 wt %. Preferably the proportion of non-fiberised material having size about 600 microns is not more than 3 wt %, preferably not more than 1.5 wt %.

The present invention is of particular value for use as a plant growth medium used as part of an engineered ground, for instance where it is deposited as a layer having a thickness in the range 5-30 cm thick, over a sub-layer of ground, preferably substantially leveled ground, provided with water drainage means. Drainage means may be based on apertured piping, for instance formed of plastic, vitreous or cement piping, or such as mole drains, a layer of very coarse drain sand/split/gravel etc.

The present invention further provides a plant growth medium provided in a layer, having plants growing thereon. Thus in this embodiment, the plants have roots which extend into the plant growth medium from which they absorb nutrients and moisture retained in the plant growth medium. The invention is of particular value where the plants are grass plants. The grass may be grown by provision of preceded layers over the plant growth medium in situ, by sowing seeds into the plant growth medium or by overlaying a thin layer of pre-grown turf. Alternatively, the plant growth medium may be pre-grown and laid onto a sub-layer of prepared ground having water drainage means, in the form of turf sods. The invention is of particular value for providing sports grounds especially grounds having heavy usage by humans or animals. For instance the sports ground may be a soccer pitch, baseball pitch, a field hockey pitch, a rugby pitch, a polo pitch, a horseracing track, an equestrian arena, a cricket ground, a golf course, a tennis court or for multiple use. We have found that the invention provides a playing surface having particularly desirable mechanical and water management characteristics for use as a soccer pitch. The preferred characteristics include elastic properties, so that upon application of vertical forces, or of torque, from shoes or boots, around a substantially vertical axis, the surface remains coherent and recovers from any deformation. This provides a ground having useful and safe properties for the players on the sports ground, avoiding injury. It also allows the sports pitch to be little damaged by such impacts, avoiding divots being pulled out, thereby minimising maintenance during or after use. The desirable properties are illustrated further in the Examples below.

The present invention further provides a method of providing the new plant growth medium, comprising low shear mixing of soil and flocks of MMVF in amounts to provide a preselected proportion of MMVF to soil based on dry mass, said mixing being carried out in the presence of moisture present in an amount in the range 5 to 50 parts, preferably 10-25 parts, per 100 parts soil based on dry weight, whereby the MMVF fibres are distributed among soil particulates.

In the method of the present invention, it is preferred that the MMVF is contacted with moist soil in the form of flocks of entangled fibres, and the low shear mixing is carried out for it at times sufficient to separate the entangled fibres of the flocks so that flocks are no longer visible to the naked eye. The mixing is preferably carried out with a device which allows continuous observation by human operator of the mixture, during which observation the completion of the separation of the entangled fibres of flocks is capable of being observed. The mixing may be carried out in a mixer which tumbles the soil and fibre, optionally having a blade arranged for rotation around an axis with a vertical component. The flocks of fibre may be added before or after the soil. Preferably moisture is present when soil and fibre are contacted, since this improves the mixing process especially the separation of fibres within the flock. The medium may be produced continuously or in a batch process.

Alternatively the plant growth medium may be provided by mixing top-soil and fibre in the form of flocks in situ on a ground where the medium is to be used for growth of plants. In an embodiment of the method, soil lying over the area of ground, for instance provided on a sub-layer having drainage means, may be prepared and watered to the selected moisture level. Onto this layer is distributed, for instance manually or by use of appropriate equipment, such as agricultural equipment used for distributing slurry or particulate matter, the required level of MMVF.

According to a further aspect of the invention a method of producing a stratified field for growth of plants comprising a substratum and a top layer, wherein the substratum comprises water drainage means and the top layer comprises a mixture of soil and MMVF, comprising the steps:

providing a layer of soil, comprising 1-10% by weight loam, at least 0.5% by weight organic matter, and having a M50 value in the range 100-500 μm and at least 95% by weight particle size less than 4 mm, on said substratum at a thickness in the range 5-30 cm, controlling the moisture level of the soil to a level in the range 5 to 50%, applying flocks of entangled MMVF to the layer of soil, optionally application of water to the MMVF, compressing the flocks of MMVF, and mixing the compressed MMVF and layer of soil by application of energy so as to separate the entangled fibres in the flocks and distribute the separated fibres among soil particles.

In this aspect of the invention the mixing is preferably continued until the fibres are loosened from one another. This is possible when the fibres in the flocks contain binder, but is more convenient to achieve where the fibres are free of binder. Any binder is preferably hydrophilic such as used in plant growth media blocks.

Suitable rates of distribution of MMVF are in the range 3 to 80 kg/m$^2$, preferably 5 to 15 kg/m$^2$.

Improved properties are achieved where the distributed flocks are compressed prior to mixing with soil, for instance by use of a conventional agricultural roller. This appears to generate appropriate levels (reduced levels) of air in the plant growth medium, thereby optimising the properties of the plant growth medium for growing plants.

Following compression of the MMVF, the MMVF and underlying soil are mixed together, for instance by use of a power harrow. Preferably the fibre is watered after application, for instance before, during or after the compression, in order to minimise release of fine particles during the mixing process. Power harrowing continues until the fibre is distributed so that flocks are no longer visible in the mixed surface. The power harrow should be controlled to provide mixing down to an appropriate level of soil, and should preferably be set at a level of 5 to 30 cm, so as to achieve a layer of plant growth medium of the desired thickness in the range 10 to 30 cm.

Following mixing, the surface may be further compressed and/or further watered.

The prepared surface may subsequently be used for growth of selected plants. For instance grass seed may be sown into the medium, or pre-prepared sods of growing turf may be positioned over the plant growth medium, or pre-sown fibre screen may be positioned over the plant growth medium on the ground. Subsequently the growing plants are treated using standard techniques. We have found that maintenance requirements are reduced since moisture management is improved, standing ground water is reduced, water-buffering is improved while moisture retention at lower levels for accessibility by plant roots is improved. We have found that the invention can improve grass density, and root strength and provides desirable playing surface especially for soccer.

According to a further aspect of the invention there is provided a sports ground comprising grass growing on a grass support layer 5 to 30 cm thick in which roots of growing grass are supported, said grass support layer comprising soil containing 1-10% by weight loam, at least 0.5% by weight organic matter, and having a particulate size distribution having M50 value in the range 100 to 500 μm and having at least 95% by weight particle size less than 4 mm, intermingled with 1 to 30 parts by weight per 100 parts soil based on dry matter MMVF fibres, having content of oxides as wt % as follows:

| | |
|---|---|
| $SiO_2$ | 35 to 50, |
| $Al_2O_3$ | 12 to 30, |
| $TiO_2$ | up to 2 |
| $Fe_2O_3$ | 2 to 12 |
| CaO | 5 to 30, |
| MgO | up to 15, |
| $Na_2O$ | 0 to 15 |

-continued

| | |
|---|---|
| K$_2$O | 0 to 15 |
| P$_2$O$_5$ | up to 3 |
| MnO | up to 3 |
| B$_2$O$_3$ | up to 3. |

The sports ground preferably has a substratum or sublayer extending across the entire playing area, that comprises drainage means. Such drainage means are as defined above.

Other embodiments of this aspect of the invention comprise the preferred features mentioned above in connection with the first, second and third aspects of the invention.

We have found that the moisture management properties of the plant growth medium also reduce the rate at which the ground on which grass is growing becomes unusable upon air temperatures falling to below 0° C., whereby sports grounds remain playable for longer during the winter period. This allows training or competitive competition to continue on such grounds in evenings when the temperature is falling, which is highly desirable, especially in northern latitudes in North America, Europe and Asia. This allows continued play and training with minimal damage to the playing surface, and reduced risk of injury to the players, in evening playing sessions.

The present invention is further illustrated in the accompanying Examples.

EXAMPLE 1—PRODUCTION OF PLANT GROWTH MEDIUM

1. Experimental Set-Up
1.1 Top Soil Properties

The top soil material was supplied as suitable for a natural grass soccer sport pitch. The specification of the soil including granulometry from species tests is shown in the following Table 1.

| Properties | Weight % |
|---|---|
| Loam | 6.1% |
| Organic component | 2.5% |
| [<4 mm] fine gravel | 100% |
| [<2.0 mm] very coarse sand | 99% |
| [<1.0] coarse sand | 96% |
| [<0.500 mm] medium sand | 85% |
| [<0.355 mm] medium sand | 74% |
| [<0.250] fine sand | 57% |
| [<0.180] fine sand | 38% |
| [<0.125] very fine sand | 24% |
| Fraction <2 μm | 2.3% |

Other

TABLE 1

| | |
|---|---|
| Structure | closed |
| M50 number | 234 |
| Texture | rough |
| Shape | Round, angular and moderate angular |

1.2 Variation of Parameters

Parameters (content of fibres to soil, binder presence and fibre length are varied to find the most suitable content of fibre product to optimize the performance and water management in top soil/fibre compositions (plant growth media).

1.3 Mixing Equipment, Conditions & Procedure

Appropriate mixing equipment, mixing conditions and mixing procedure are defined and given in the tables below.

TABLE 2

Mixing equipment, conditions & procedure

Mixing conditions

| | |
|---|---|
| Mixing equipment | Stephan mixer |
| Mixing time | 60 sec Total, of which 30 sec (without moisture) 30 sec (with moisture) |
| Mixing speed | 1500 rpm |
| Moisture content | 15 wt. % |
| Mix batches | 3000 gram |
| Amount of batches per mix | 2 |

1.4 Test Methods

The test methods for determination of the performance (mechanical tests) and water management (water behavior) of the plant growth medium are given in the next table. The tests are carried out on samples of the soil/fibre blend forming the plant growth media, subjected to conditions to simulate application to the ground, by filling into open-topped boxes and subjecting to compression at a pressure corresponding to an agricultural roller.

TABLE 3

Summary of test methods (mechanical tests, water behavior, frost and soil condition

| Property | Test method | Description |
|---|---|---|
| Mechanical tests | Vertical ball deformation | Deformation of the soil by using a 5 kg ball, dropped from 100 cm (average of 3). |
| | Penetration resistance | Force that is needed to penetrate the medium on a depth of ca. 10 mm using a pocket penetrometer (average of 5). |
| | Torsion resistance | Shear stress [kg/cm$^2$] of the medium at a surface of minimal 25 mm in diameter. |
| | Tensile testing | Force (N/mm$^2$) against 15 mm of deformation using the tensile testing machine. |
| Water behavior | Water content | Moisture content of the soil in volume percentage. |
| | Drying the soil | Drying the medium at 110 ± 5° C. |
| | Water buffer capacity | Time [sec] to store an amount of water [ml] into the medium. |
| | Water evaporation | Water loss [%] by evaporation in time. |
| Frost | Frost time | Time to reach the medium a temperature of 0° C. |
| Soil condition | pH value | pH value of the medium. |

The soil and fibre combinations are set out in Table 4. The "granulate" comprises flocks (or granules) of stone wool fibres free of binder. The fibres with binder are chopped flocks of Grodan Vital plant growth medium, i.e. fibres bound by hydrophilic binder. Batches of fibre and soil are subjected to mixing in a Stephan mixer with soil at 1500 rpm for 60 s, of which 30 s is carried out without addition of water, the final 30 s after addition of water (15%). A preliminary step of tumbling the chopped bound fibre alone was conducted to separate the fibres in the flocks. The following mixtures were subjected to the tests described below:

TABLE 4

| Example No | Type of fibres | Fibre length | Fibre load | Mass soil | Mass fibres batch | Moisture content (wt. %) | Moisture content (gram) |
|---|---|---|---|---|---|---|---|
| 01 | Reference (no fibres) | — | — | 3000 gram | — | 15 wt. % | 450 |
| 02 | Granulate | ±4000 μm | 2 wt. % | 3000 gram | 60 gram | 15 wt. % | 459 |
| 03 | Granulate | ±4000 μm | 5 wt. % | 3000 gram | 150 gram | 15 wt. % | 472.5 |
| 04 | Fibres with binder | ND | 2 wt. % | 3000 gram | 60 gram | 15 wt. % | 459 |
| 05 | Fibres with binder | ND | 5 wt. % | 3000 gram | 150 gram | 15 wt. % | 472.5 |
| 06 | Synthetic fibres | 30 mm | 0.1 wt. % | 3000 gram | 3 gram | 15 wt. % | 454.5 |

Torsion resistance is carried out using a pocket value tester (C101 device). After compressing the plant growth medium sample in a suitable box, the device is set to 0, and is then held against the surface until the C101 part is completely pushed into the soil. The device is then turned until the surface crashes. The value of torsion at which the surface crashes is determined. The test is repeated three times, after each time mixing and recompressing the sample. The mean value is determined and the average torsion resistance is calculated.

The tensile deformation testing is carried out on the compressed sample in a suitable open topped box. A compression device having a head with surface area of 25 cm$^2$ is positioned at the surface and is then pushed into the surface with a preload of 10 N to a depth of 15 mm. The resistance to compression at the point 15 mm is determined. When the preload is gone (when the soil comes out of the box or 'cracks' the test was stopped. The test is performed three times, before each test the soil is mixed and compressed as per the standard technique.

The water content of the plant growth media are determined using a standard moisture meter, taking care that the sensors are fully covered by plant growth medium in compressed form. The test is repeated three times and the mean taken.

The water-buffer capacity is the capacity of the plant growth medium to absorb a predetermined amount of water when the starting moisture content is low, around 5 volume %, and when the moisture content is high, around 25 volume %. Plant growth medium having the specified moisture content is filled into an open ended, vertically arranged pipe having cross section around 12 cmdiameter, by sequentially placing portions into the pipe and compressing them, until a depth of around 20 cm of plant growth medium in compressed form is reached. The amount of material used is weighed. 100 ml water is poured into the top of the pipe, at T=0. The time at which the surface is dry, that is once the water has soaked into the surface, is determined. Further 100 ml aliquots of water are poured in, with the time determined for the surface to dry after each addition. Furthermore, the amount of water added before the total volume starts to drain from the base, judged by observation of water passing through a filter paper located across the open end, is determined.

The drain capacity, which is related to moisture buffer capacity, is the capacity of saturated plant growth medium to drain 1 l of water. This test is carried out in a plastic pipe containing compressed plant growth medium prepared as for the water buffer capacity measurement. 1500 is added to the soil to saturate it. Once the medium is no longer draining water from the base, the amount of plant growth medium and water in the pipe is weighed. Then 1000 ml water are added to the soil at T=0. The time taken for the surface to dry again, that is for the 1000 ml water to drain through the surface, is determined. The time taken for 1000 ml water to drain from the lower end of the pipe is determined.

The water evaporation measurement is relevant for determining the rate of evaporation from the plant growth medium in hot climates. It would be desirable for the rate of evaporation to be as low as possible. The technique is carried out by positioning an open box containing compressed plant growth medium having known moisture content (around 25-30 vol. %), stored in an oven at 40° C. and ventilated with air of humidity of 40%. The soil is measured hourly until the weight stabilises.

The time taken to freeze the plant growth medium with an air temperature of −18° C. is determined. Compressed plant growth medium in an open topped box, having a known moisture content (around 25-30 vol. %.) is placed in a freezer, which is switched from ambient to freeze. Sensors positions 4 cm below the surface of the plant growth medium are set to record the temperature change, as the temperature within the freezer is reduced to −18° C. The time at which all the sensors reach −5° C. is determined.

Figure 1:
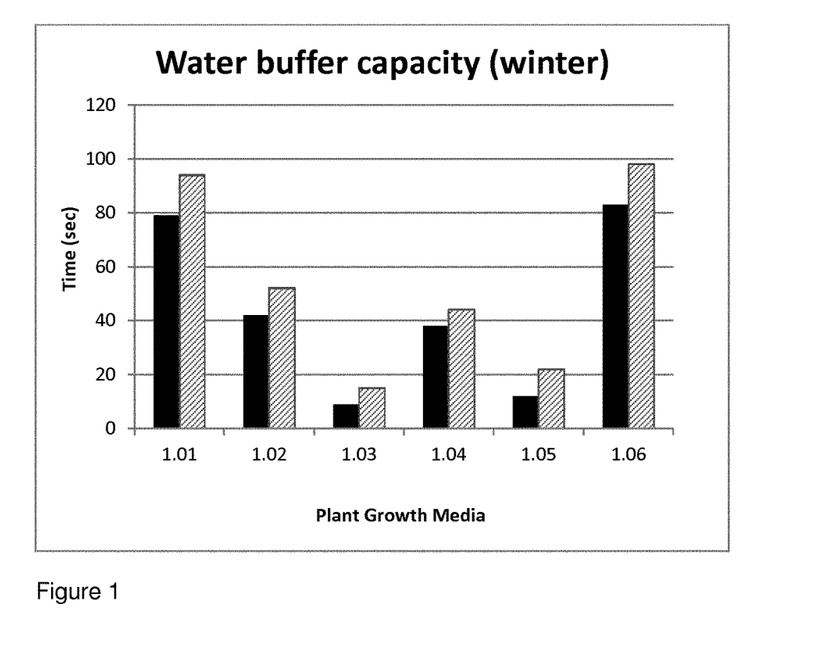
FIG. 1 illustrates test results of the winter water buffer capacity of the plant growth medium.
Figure 2:
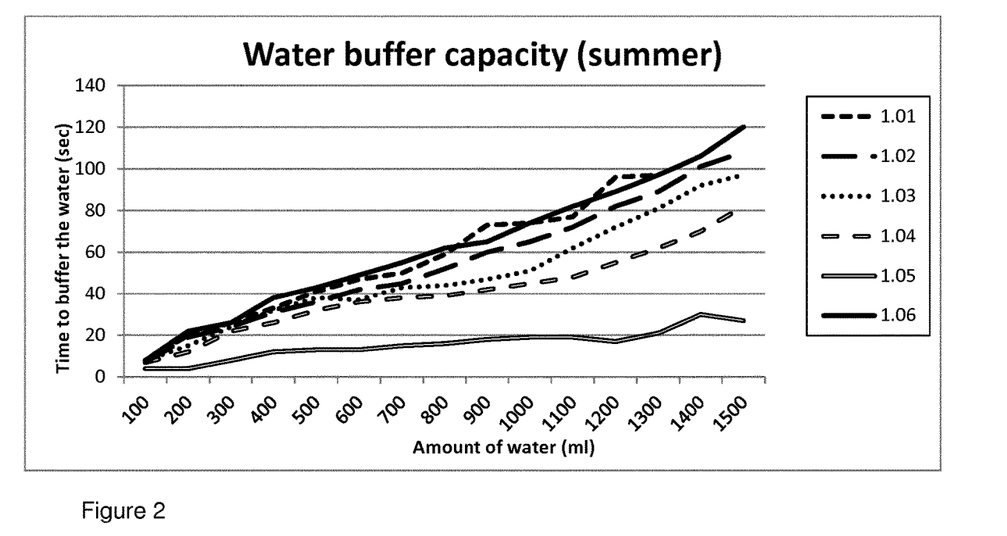
FIG. 2 illustrates test results of the summer water buffer capacity of the plant growth medium.
Figure 3:
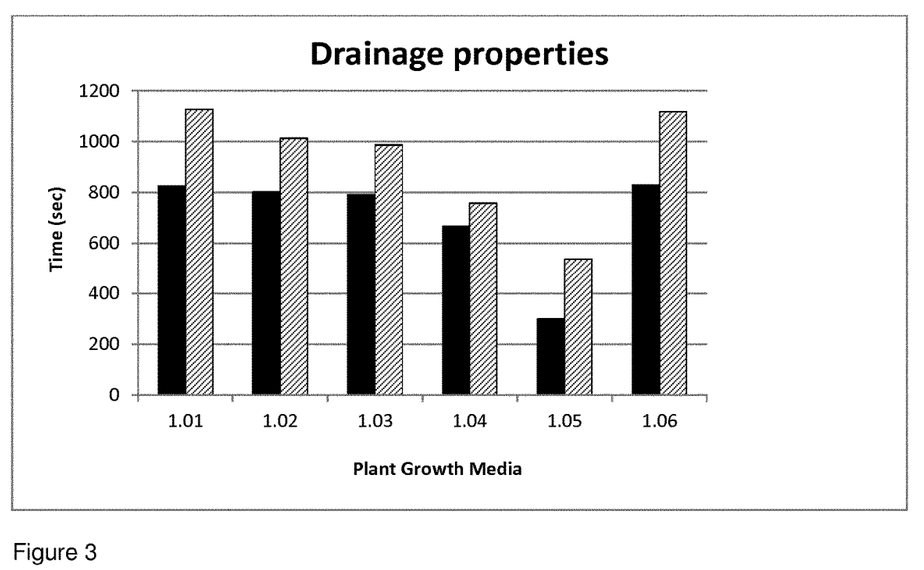
FIG. 3 illustrates test results of the drainage properties of the plant growth medium.
Figure 4:
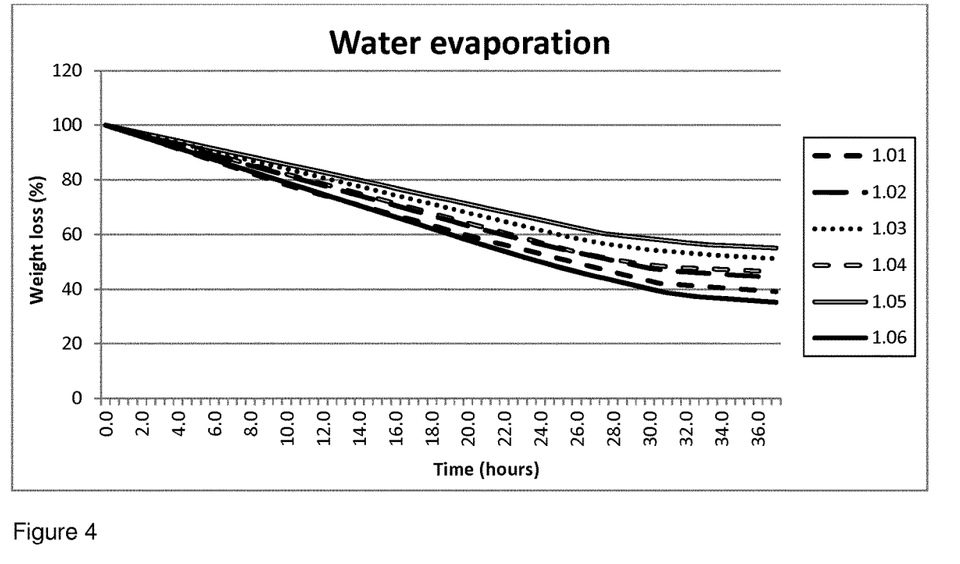
FIG. 4 illustrates test results of water evaporation of the plant growth medium.

The results of some of the tests are shown in Table 5 below. The results of the water-buffering, drainage properties and water evaporation tests are shown in FIGS. 1 to 4.

TABLE 5

Test Results

| | Example | | | | | |
|---|---|---|---|---|---|---|
| Test | 1.01 | 1.02 | 1.03 | 1.04 | 1.05 | 1.06 |
| Vertical ball deformation (cm) | 4.0 | 3.1 | 2.7 | 3.2 | 2.9 | 2.8 |
| Penetration resistance pin (kg/cm$^2$) | 0.3 | 0.75 | 1.05 | 0.7 | 1.0 | 0.55 |
| Coin (kg/cm$^2$) | 2.7 | 3.9 | 4.8 | 3.8 | 4.7 | 3.6 |
| Torsion resistance (kg/cm$^2$) | 0.85 | 1.25 | 1.75 | 1.55 | 1.83 | 1.77 |
| Tensile modulus (N/mm$^2$) | 0.62 | 0.39 | 0.38 | 0.39 | 0.34 | 0.54 |
| Smax (N/mm$^2$) | 0.22 | 0.35 | 0.25 | 0.30 | 0.25 | 0.41 |
| Fmax % | 30 | 30 | 30 | 30 | 30 | 30 |
| Time to freeze (min) | 320 | 340 | 370 | 340 | 380 | 320 |

TABLE 5-continued

Test Results

| | Example | | | | | |
|---|---|---|---|---|---|---|
| Test | 1.01 | 1.02 | 1.03 | 1.04 | 1.05 | 1.06 |
| pH | 8.5 | 8.5 | 8.5 | 8.5 | 8.5 | 8.1 |

CONCLUSIONS

The presence of stone wool material decreases the vertical ball deformation of the soil in the falling ball method. The use of flocks of unbound fibres at the same level provides improved deformation resistance compared to bound wool samples. The higher level of incorporation of stone wool provides additional resistance to deformation. Penetration resistance is similarly improved by the presence of stone wool fibres, for both the pin and the coin. Again the use of unbound wool provides improved resistance to penetration. The presence of stone wool materials also increases the torsion resistance of the soil, which indicates a resistance to damage on use of the playing surface. The higher level of incorporation provides improved torsion resistance. In the tensile testing results indicate that the stone wool fibres disturb the packaging of sand and loam particles. Soils containing significant levels of loam and larger particles normally tend to high packing levels and high compression and thus density. Addition of the fibres, especially loose fibres, is shown in these experiments to disturb the packaging for integration between the large and the small particles with the result that the plant growth medium is less stiff. This means that the use of fibres in the plant growth medium in the surface of a sports pitch can support the energy restitution of a sports pitch for the improved comfort and safety of the players.

The various tests on the water-buffer capacity of the plant growth media indicate that the presence of stone wool fibres significantly improves the buffering capacity, both when the soil is dry (simulating summer) and when it is wet (simulating winter). Also the water evaporation rate appears to decrease with the presence of stone wool. This is likely to be due to reduced levels of water close to the surface due to improved drainage, and thus reduction of the tendency of water to be available for evaporation.

The freezing time results show that the presence of stone wool reduces the rate at which plant growth medium reaches low temperatures in the presence of cold air temperatures. The reduction is proportional to the amount of fibre incorporated. This indicates that sports pitches used in winter should be usable for as much as one hour longer in evenings, increasing available training time.

The pH values are not influence by the presence of stone wool.

The comparative results using synthetic fibre in place of stone wool fibre, which is a commercially available treatment, indicates that equivalent properties may be achieved for stone wool incorporation. The method of production of the plant growth medium by mixing soil and fibre is significantly improved compared to use of synthetic fibre, however. There are difficulties with mixing using available mixers and application procedures for the synthetic fibres, in that incorporation of levels more than 0.1% by weight leads to problems mixing, so that inhomogeneities are observed and difficulties with providing level ground on application.

EXAMPLE 2—GROWTH OF PLANTS ON MEDIA

This Example compares the influence of fibres, when incorporated in flock form or distributed in loose form into soil, used as a plant growth medium for growing grass.

For all of the tests, a top-soil, similar to that used in Example 1, is mixed with stone wool fibre, at four levels, 2.5, 5, 7.5 and 10% by weight. Batches of 300 g soil are mixed with stone wool in the form of flocks. For tests where the fibre is to be broken up so that fibres are distributed in the plant growth medium, mixing is carried out in a Stefan Mixer, mixed at 1500 rpm for 2 minutes. For tests where the fibre is to remain in the form of flocks, mixing is done in a concrete mixer for 15 minutes, after which flocks of fibre could still be seen in the mixed medium.

Two lots of trials were conducted. Field trials were conducted where flocks of the medium were laid onto test fields and compressed, with grass seed being sown in a normal manner. The results show that the presence of fibre flocks in soil seems to disrupt the ability of grass to grow and reduces the density of grass. However where fibres are fully dispersed into the soil by harrow, grass growth is changed only to a small extent by the presence of fibres, these reducing the density of grass to a small extent.

For pot trials, grass was grown in pots, which were watered by rain after grass seed was sown. Moisture determinations using moisture meters were determined weekly. The moisture in the pot trials, the grass density is improved compared to the reference by the presence of loose fibres, at both 2.5 and 5% by weight. Also the presence of fibres leads to better moisture retention after dry periods, so that grass colour is improved for both 5% and 7.5% by weight fibres.

A comparison of the roots following a period of growth shows that the roots of grass grown in plant growth medium with loose fibres distributed amongst the soil particles gives improved root structure. Where flocks of stone wool are incorporated, the development of roots appears to be disrupted.

From the experiments, when stone wool fibres are used in soil with a growing grass medium, the moisture content can be increased. The moisture content increases with increasing fibre content, both during wet and dry weather conditions, using loose fibres and fibre flocks in soil. However the presence of loose fibre content improves the covering ability and density of the grass whereas flocks provide a deterioration of the density of the grass. A higher fibre content of loose fibres can keep the grass green for a longer period of time during dry and warm weather conditions due to increase of moisture content retention with higher levels of fibre. Loose fibres in the plant growth medium seem to improve the structure of roots. During measuring of the moisture content, it was noted that the resistance to penetration by the moisture metering equipment is higher when more fibres are used, which is due to fibres improving the strength of grass roots in the soil.

The invention claimed is:

1. A plant growth medium comprising soil that comprises 1 to 10% loam wherein loam is a fraction of soil that passes through a sieve with 0.063 mm openings, at least 0.5% organic matter and has particulate size distribution having a M50 value in the range 100-500 µm and having at least 95% by weight particle size less than 4 mm, further comprising man-made vitreous fibres (MMVF), wherein the man-made vitreous fibres are present in an amount of from 0.5 to 50 parts by weight per 100 parts soil, on a dry matter basis, and wherein the fibres are present in loose form distributed in the soil particulate matter.

2. A plant growth medium according to claim 1, wherein the MMVF are present in an amount in the range 1 to 30 parts per 100 parts by weight soil.

3. A plant growth medium according to claim 2, wherein the MMVF are present in an amount in the range 2 to 20 parts per 100 parts soil.

4. A plant growth medium according to claim 3, wherein the MMVF are present in an amount in the range 4-10 parts per 100 parts soil.

5. A plant growth medium according to claim 1, having a moisture content in the range 5 to 50 parts by weight per 100 parts soil dry matter.

6. A plant growth medium according to claim 5, having a moisture content in the range 10 to 25 parts by weight per 100 parts soil dry matter.

7. A plant growth medium according to claim 1, wherein the MMVF are stone fibres having content of oxides as wt % as follows:

|   |   |
|---|---|
| $SiO_2$ | 35 to 50 |
| $Al_2O_3$ | 12 to 30 |
| $TiO_2$ | up to 2 |
| $Fe_2O_3$ | 2 to 12 |
| CaO | 5 to 30 |
| MgO | up to 15 |
| $Na_2O$ | 0 to 15 |
| $K_2O$ | 0 to 15 |
| $P_2O_5$ | up to 3 |
| MnO | up to 3 |
| $B_2O_3$ | up to 3. |

8. A plant growth medium according to claim 1, wherein the fibres have length at least 2000 microns.

9. A plant growth medium according to claim 8, wherein the fibres have length at least 3500 microns.

10. A plant growth medium according to claim 1, wherein the diameter of the fibres is in the range 3 to 15 µm.

11. A plant growth medium according to claim 1, in the form of a layer 10 to 30 cm thick supported on a sub-layer of ground preferably provided with water-drainage means.

12. A plant growth medium according to claim 1, further having plants growing thereon.

13. A plant growth medium according to claim 12, wherein the plants are grass plants.

14. A plant growth medium according to claim 12, wherein the plant growth medium and plants cover a sports ground.

15. A method of producing a stratified field for growth of plants comprising a substratum and a top layer, wherein the substratum comprises water drainage means and the top layer comprises a mixture of soil and MMVF, comprising the steps:
  providing a layer of soil, comprising 1-10% loam by weight, wherein loam is a fraction of soil that passes through a sieve with 0.063 mm openings, at least 0.5% by weight organic matter, and having a M50 value in the range 100-500 µm and at least 95% by weight particle size less than 4 mm, on said substratum at a thickness in the range 5-30 cm,
  controlling the moisture level of the soil to a level in the range 5 to 50%,
  applying flocks of entangled MMVF to the layer of soil, optionally application of water to the MMVF,
  comprising compressing the flocks of MMVF, and,
  mixing the compressed MMVF and layer of soil by application of energy so as to separate the entangled fibres in the flocks and distribute the separated fibres among soil particles.

16. A method according to claim 15 wherein the fibres in the product are loose.

17. A method according to claim 15 wherein the product is a plant growth medium.

18. A method of providing a plant growth medium according to claim 1, comprising low shear mixing of soil and flocks of MMVF in amounts to provide a preselected proportion of MMVF to soil based on dry mass, said mixing being carried out in the presence of moisture present in an amount in the range 10 to 50 parts per 100 parts soil based on dry weight, whereby the MMVF fibres are distributed among soil particulates.

19. A method according to claim 18, wherein the MMVF is contacted with moist soil in the form of flocks of entangled fibres and the low shear mixing is carried out for a time sufficient to separate the entangled fibres of the flocks so that flocks are no longer visible to the naked eye.

20. A method according to claim 18, wherein the flocks of entangled fibres are primarily formed by separating a bale of MMVF wool into flocks and the flocks are contacted with soil.

21. A method according to claim 20, wherein the flocks are compressed, optionally after addition of water, before being subjected to low shear mixing with the soil.

22. The method according to claim 21, wherein the compressing increases the bulk density of the flocks by a factor of at least 1.5.

23. A method according to claim 21, wherein the compression is carried out in situ on the ground after distribution of flocks.

24. A method according to claim 18, wherein the low shear mixing is carried out in situ on the ground by means of a harrow.

25. A method according to claim 18, wherein the soil is distributed onto a sub-layer, MMVF fibre is distributed onto the soil in the form of flocks, and low shear mixing is applied in situ.

26. A method according to claim 25, wherein MMVF flocks are applied to the soil at a value of 5-20 kg/m².

27. A method according to claim 26, wherein MMVF flocks are applied to the soil at a value of 8-15 kg/m².

28. A method according to claim 15, wherein the MMVF are stone fibres having content of oxides as wt % as follows:

|   |   |
|---|---|
| $SiO_2$ | 35 to 50 |
| $Al_2O_3$ | 12 to 30 |
| $TiO_2$ | up to 2 |
| $Fe_2O_3$ | 2 to 12 |
| CaO | 5 to 30 |
| MgO | up to 15 |
| $Na_2O$ | 0 to 15 |
| $K_2O$ | 0 to 15 |
| $P_2O_5$ | up to 3 |
| MnO | up to 3 |
| $B_2O_3$ | up to 3, | further wherein the fibres have length of at least 2000 µm, and number average diameter in the range 3 to 15 µm.

29. A method comprising cultivating and growing plants using the plant growth medium according to claim 1.

30. The method according to claim 29, wherein the plants are grown from seed sown into the plant growth medium.

31. The method according to claim 29 or 30, wherein the plants are grass plants.

32. The method according to claim 11, wherein the grass surface is utilised as a sports ground.

33. The method according to claim 12, wherein the sports ground is located in a frost prone location.

34. The method according to claim 12, wherein the sports grounds is a soccer pitch.

35. A sports ground comprising grass growing on a grass support layer 5 to 30 cm thick in which roots of growing grass are supported, said grass support layer comprising soil containing 1-10% loam by weight, wherein loam is a fraction of soil that passes through a sieve with 0.063 mm openings, at least 0.5% by weight organic matter, and having a particulate size distribution having M50 value in the range 100 to 500 μm and having at least 95% by weight particle size less than 4 mm, intermingled with 1 to 30 parts by weight per 100 parts soil based on dry matter MMVF fibres, having content of oxides as wt % as follows:

| | |
|---|---|
| $SiO_2$ | 35 to 50, |
| $Al_2O_3$ | 12 to 30, |
| $TiO_2$ | up to 2 |
| $Fe_2O_3$ | 2 to 12 |
| CaO | 5 to 30, |
| MgO | up to 15, |
| $Na_2O$ | 0 to 15 |
| $K_2O$ | 0 to 15 |
| $P_2O_5$ | up to 3 |
| MnO | up to 3 |
| $B_2O_3$ | up to 3. |

36. A sports ground according to claim 35, wherein the MMVF are substantially free of fibre binder.

37. A sports ground according to claim 35, wherein the MMVF are stone fibres having content of oxides as wt % as follows:

| | |
|---|---|
| $SiO_2$ | 35 to 50, |
| $Al_2O_3$ | 12 to 30, |
| $TiO_2$ | up to 2 |
| $Fe_2O_3$ | 2 to 12 |
| CaO | 5 to 30, |
| MgO | up to 15, |
| $Na_2O$ | 0 to 15 |
| $K_2O$ | 0 to 15 |
| $P_2O_5$ | up to 3 |
| MnO | up to 3 |
| $B_2O_3$ | up to 3, | further wherein the fibres have length at least 2000 microns;

further wherein the diameter of the fibres is in the range 3 to 15 μm.

38. A sports ground according to claim 35, which is a soccer pitch.

* * * * *